(12) United States Patent
Kellens et al.

(10) Patent No.: US 7,670,634 B2
(45) Date of Patent: Mar. 2, 2010

(54) METHOD FOR VACUUM STRIPPING OF OILS AND FATS

(75) Inventors: Marc Kellens, Muizen (BE); Dimitri De Suray, Grez-Doiceau (BE)

(73) Assignee: De Smet Engineering N.V., Zaventem (BE)

( * ) Notice: Subject to any disclaimer, the term of this patent is extended or adjusted under 35 U.S.C. 154(b) by 1055 days.

(21) Appl. No.: 10/912,361

(22) Filed: Aug. 5, 2004

(65) Prior Publication Data
US 2005/0066823 A1 Mar. 31, 2005

(30) Foreign Application Priority Data
Aug. 6, 2003 (EP) .................................. 03077457

(51) Int. Cl.
*A23B 4/00* (2006.01)
(52) U.S. Cl. ...................... 426/488; 426/487; 426/492; 426/494
(58) Field of Classification Search .................. 426/488, 426/487, 492, 494
See application file for complete search history.

(56) References Cited
U.S. PATENT DOCUMENTS

| | | | |
|---|---|---|---|
| 1,988,648 A | 1/1935 | Engelke | |
| 2,461,694 A | 2/1949 | McCubbin et al. | |
| 2,470,652 A | 5/1949 | Scofield | |
| 2,571,143 A | 10/1951 | Leslie | |
| 2,674,609 A * | 4/1954 | Beal et al. | 203/63 |
| 2,678,327 A | 5/1954 | Clayton | |
| 2,691,830 A | 10/1954 | Karnofsky | |
| 2,713,023 A * | 7/1955 | Irvine | 203/76 |
| 2,746,168 A | 5/1956 | Rickabaugh | |
| 2,804,427 A * | 8/1957 | Suriano | 203/92 |
| 2,826,601 A | 3/1958 | Barsky | |
| 2,983,612 A | 5/1961 | Eichberg | |
| 3,310,487 A * | 3/1967 | Johnson et al. | 208/355 |
| 3,367,034 A | 2/1968 | Good | |
| 3,367,044 A | 2/1968 | Fitch | |

(Continued)

FOREIGN PATENT DOCUMENTS

BE 1005617 A3 11/1993

(Continued)

OTHER PUBLICATIONS

Kuroda et al., "An Edible Oil Deodorizer with a Direct-Fired Heater," *Journal of the American Oil Chemists' Society* 66:1781-1783 (1989).

(Continued)

*Primary Examiner*—Anthony Weier
(74) *Attorney, Agent, or Firm*—Wegman, Hessler & Vanderburg

(57) ABSTRACT

An apparatus for use in a vacuum stripping process having a first stripping vessel (2); at least one second further downstream stripping vessel (3), said at least one second further downstream stripping vessel (3) containing at least two trays (12), (13), (14) and (15) each provided with sparging (16), (17), (18) and (19) respectively, and further having a collector (4) connecting said first stripping vessel (2) and said at least one second stripping vessel (3), said collector (4) being provided with inlet openings above each said tray (12), (13), (14) and (15) and said collector (4) being connected to a pump (5) with a discharge into said first stripping vessel (2).

18 Claims, 1 Drawing Sheet

U.S. PATENT DOCUMENTS

| | | | |
|---|---|---|---|
| 3,392,455 | A | 7/1968 | Klingsbaker, Jr. et al. |
| 3,634,201 | A | 1/1972 | Kehse |
| 4,049,686 | A | 9/1977 | Ringers et al. |
| 4,089,880 | A | 5/1978 | Sullivan |
| 4,138,230 | A * | 2/1979 | Thompson ............. 95/169 |
| 4,164,506 | A | 8/1979 | Kawahara et al. |
| 4,415,443 | A * | 11/1983 | Murphy ............. 208/355 |
| 4,601,790 | A | 7/1986 | Stage |
| 4,664,784 | A * | 5/1987 | Harandi ............. 208/354 |
| 4,778,489 | A | 10/1988 | Weber |
| 4,996,072 | A | 2/1991 | Marschner et al. |
| 5,041,245 | A | 8/1991 | Benado |
| 5,214,171 | A | 5/1993 | Dijkstra et al. |
| 5,401,867 | A | 3/1995 | Sitzmann et al. |
| 5,486,318 | A | 1/1996 | McKeigue et al. |
| 6,001,220 | A | 12/1999 | Hillstöm et al. |
| 6,013,817 | A | 1/2000 | Stern et al. |
| 6,127,560 | A | 10/2000 | Stidham et al. |
| 6,172,247 | B1 * | 1/2001 | Copeland et al. ............. 554/83 |
| 6,172,248 | B1 | 1/2001 | Copeland et al. |
| 6,426,423 | B1 | 7/2002 | Copeland et al. |
| 6,623,604 | B1 | 9/2003 | Elsasser et al. |
| 6,658,851 | B2 | 12/2003 | Jellema et al. |
| 6,953,499 | B2 | 10/2005 | Kellens et al. |
| 2002/0169033 | A1 | 11/2002 | Sery |
| 2003/0070317 | A1 | 4/2003 | Anderson et al. |
| 2006/0030012 | A1 | 2/2006 | Kellens et al. |
| 2006/0057263 | A1 | 3/2006 | Kellens et al. |
| 2008/0051599 | A1 | 2/2008 | Adami et al. |
| 2008/0081097 | A1 | 4/2008 | Kellens et al. |

FOREIGN PATENT DOCUMENTS

| | | |
|---|---|---|
| DE | 265074 A1 | 2/1989 |
| DE | 19520675 A1 | 12/1996 |
| EP | 0195991 A2 | 10/1986 |
| EP | 0520097 A1 | 12/1992 |
| EP | 1157615 A2 | 11/2001 |
| EP | 1505145 B1 | 6/2006 |
| EP | 1624047 B1 | 10/2006 |
| EP | 1637201 B1 | 8/2007 |
| EP | 1818088 A1 | 8/2007 |
| EP | 1894913 A1 | 3/2008 |
| EP | 1905815 A1 | 4/2008 |
| FR | 2103267 | 4/1972 |
| GB | 589534 | 6/1947 |
| GB | 777413 | 6/1957 |
| GB | 789777 | 1/1958 |
| GB | 816522 | 7/1959 |
| GB | 1229266 | 4/1971 |
| GB | 1400836 | 7/1975 |
| GB | 1424049 | 2/1976 |
| GB | 1429773 | 3/1976 |
| GB | 1561494 | 2/1980 |
| GB | 2100613 A | 1/1983 |
| GB | 2176713 | 1/1987 |
| GB | 2451577 A | 2/2009 |
| WO | WO 86/04603 | 8/1986 |
| WO | WO 99/53001 A1 | 10/1999 |
| WO | WO 02/062157 A2 | 8/2002 |
| WO | WO 2005/100519 A1 | 10/2005 |
| WO | WO 2007/082766 A1 | 7/2007 |

OTHER PUBLICATIONS

Office Action (U.S. Appl. No. 11/841,255), mailed Sep. 19, 2008.

U.S. Appl. No. 12/175,837, filed Jul. 18, 2008, Kellens et al.

U.S. Appl. No. 12/175,859, filed Jul. 18, 2008, Van Damme.

Andersen, *Refining of Fats and Oils*, 2nd Ed., Pergamon Press, United Kingdom, 1962, pp. 187-199.

Erickson, *Practical Handbook of Soybean Processing and Utilization*, AOCC Press, Champaign, IL, 1995, pp. 246-249.

Minifie, *Chocolate, Cocoa, and Confectionery, Science and Technology*, 2nd Ed., AVI Publishing Company Inc., Westport, CT, 1980, pp. 67-88.

O'Brien et al., *Introduction to Fats and Oils Technology*, 2nd Ed., AOCS Press, Champaign, IL, 2000, pp. 256-258.

Van Gerpen et al., *Biodiesel Production Technology*, U.S. Department of Commerce, Jul. 2004.

Weber et al., "Fat Crystallizers with Stirring Surfaces: Theory and Practice," *OCL Oléagineux* 5:381-384, 1998.

English Language Explanation of BE 1005617 A3.

English Language Explanation of DE 19520675 A1.

European Search Report for European Patent Application No. 03077457 completed Feb. 10, 2004.

European Search Report for European Patent Application No. 04077550 completed Feb. 17, 2005.

European Search Report for European Patent Application No. 06017333 completed Feb. 23, 2007.

European Search Report for European Patent Application No. 06020388 completed Mar. 28, 2007.

European Search Report for European Patent Application No. 07075709 completed Nov. 21, 2007.

European Search Report for European Patent Application No. 07075840 completed Jan. 29, 2008.

Office Action (U.S. Appl. No. 11/198,084), mailed Dec. 3, 2007.

Office Action (U.S. Appl. No. 11/198,084), mailed Jul. 9, 2008.

Office Action (U.S. Appl. No. 11/226,758), mailed Aug. 18, 2008.

* cited by examiner

METHOD FOR VACUUM STRIPPING OF OILS AND FATS

The present invention concerns a method for vacuum stripping, especially a method for vacuum stripping as used in the physical refining and deodorization of fatty glycerides, herein-after referred as edible oils, such as but not limited to vegetable oils, hydrogenated vegetable oils and animal fats as well as an apparatus for vacuum stripping of such materials.

Vegetable oils as produced by expelling and/or solvent extraction of oil seeds and animal fats as produced by rendering, often require deodorization to obtain a bland tasting final product. Only a few oils, as for instance virgin olive oil, are not subjected to such a deodorization treatment. Such non-deodorised oils thus retain their particular flavour for which some customers appreciate them. However, most non-deodorised vegetable oils and animal fats exhibit an excessively strong and unpleasant flavour and therefore must be deodorised.

The earliest deodorization processes involved mixing a vegetable oil with water and subjecting this mixture to a steam distillation process. However, it was soon realised that reducing the pressure below atmospheric diminished the amount of water that had to be distilled to achieve the required extent of deodorization. This led to deodorization by steam stripping under greatly reduced pressure. In this stripping process, an inert gas like steam or nitrogen, is blown through the oil and thus entrails its most volatile components.

Because this steam stripping process requires a good contact between the stripping medium and the oil being deodorised and since such a good contact is also required in fractional distillation processes, early equipment used for steam stripping bore a quite close resemblance to fractional distillation columns in that both tended to be fitted with trays on which bubble caps were mounted. These caps force the gas stream moving upwards to pass trough the liquid held on the tray and thus establish the required contact between the liquid oil and the gas stream.

These bubble caps have the disadvantage of constituting a resistance to the gas flow that has to overcome the hydrostatic oil height in the tray. Consequently, the pressure below a tray fitted with bubble caps is somewhat higher than the pressure above that tray and if a number of trays are superimposed, the difference in pressure below the lowest and above the highest tray can be quite considerable. With the oil flowing down by gravity from each tray to the tray below, this means that the oil on the lowest tray is exposed to the highest deodorization pressure and thus to the least effective deodorization conditions.

It is therefore not surprising that means have been developed to remedy this situation. Accordingly, U.S. Pat. No. 2,461,694 suggests a continuous distillatory process for deodorising fatty material in two or more zones of successively reduced pressure, said process comprising conveying the spent deodorising gas from a zone of lower pressure to a zone of higher pressure at a temperature at least as high as the temperature of the gas leaving the zone of lower pressure and bringing the conveyed gas into contact with the fatty material in the zone of higher pressure, whereby the capacity of the conveyed gas for deodorising fatty material at higher pressures is utilised. A preferred apparatus for carrying out this process comprises a plurality of vaccum chambers or zones connected in series with steam vacuum jets for inducing the interchamber flow of gaseous products toward the chamber which first receives the fatty material to be deodorised, and also connected in series with pipes to provide for countercurrent interchamber flow of liquid fatty material. In this apparatus, each chamber contains means for providing intimate contact between steam and fatty material, such as bubble cap trays and packings.

Similarly, French Patent No. 2.103.267 describes a process for the distillation of liquids while using steam, preferably for de-acidifying or deodorising vegetable oils or animal fats, wherein the liquid mixture successively flows through several treatment stages wherein pressure is decreasing and which are fed with a steam being less and less concentrated with the components to be separated by distillation. An apparatus for carrying out this process is a distillation column wherein the product to be treated flows from top to bottom, comprising several superimposed trays with a spiral guiding of the liquid, wherein each tray is associated with a steam ejector driven by motive steam.

A disadvantage of the process according to FR 2.103.267 is the re-dissolution of the volatile components into the oil to be deodorised. Indeed, according to Raoult's law, the volatile content of the stripping gas stream will be determined by the volatile content of the liquid and the vapour pressure of the pure volatile compound. If then a steam ejector compresses this gas stream, its volatile content will increase proportionally to the compression ratio. By adding the motive steam of the steam ejector to the gas stream, the increase in the volatile content will be somewhat smaller but nevertheless, it is likely that, if the compressed gas stream were to be allowed to reach equilibrium with the liquid in a tray, this would result in volatile components moving back into the liquid.

Another and more convenient solution was soon developed. This latter solution comprises connecting each individual tray of the deodorization column to a common vacuum system with the result that the same, low pressure is maintained above each tray and that volatile components having been stripped out of the oil do not have the opportunity to move back into the oil. Three systems of construction have reached an industrial stage. In a first system, holes have been made in the deodoriser shell wall above each tray, with each hole leading to an external main vacuum duct. In the other two systems, the main vacuum duct resides within the deodoriser shell, either centrally when each tray, except the lowest one, has a hole in its centre, or between the trays and the shell, when the trays, except for the lowest tray, are not welded against the shell wall. All of these three systems have in common that each tray is provided with its own supply of stripping steam. Consequently, after having been in contact with the oil, the steam conveying the compounds removed from the oil is carried away by the vacuum system and thus does not come into contact with the oil in another tray.

As mentioned above, the object of the deodorization process is the removal of malodorous compounds. This removal can be achieved in a stripping process since said malodorous compounds are more volatile than the final oil product. Since fatty acids are also more volatile than the final oil product, they can also be removed from the oil by the very same vacuum stripping process. Such a removal process is commonly called a de-acidification. De-acidification by stripping is commonly referred to as physical refining or steam refining.

According to U.S. Pat. No. 4,089,880 it is desirable to pre-treat a de-gummed crude vegetable oil with an acid such as phosphoric or citric acid in order to capture trace metals and then with a bleaching clay before subjecting it to the physical refining treatment to yield a fully deodorised, high stability, bland, finished oil.

High acidity oils such as for instance palm oil require a substantial reduction in their volatile content during physical refining which in turn requires a substantially increased amount of stripping medium and therefore also of motive steam. Consequently, it is not surprising that means have been sought to reduce this amount of steam by using a packed column that operates counter-currently with the oil flowing downwards by gravity and the stripping medium moving upwards. Such a process incorporating a packed column for the physical refining of vegetable oil has been described in WO 86/04603. According to this process, the oil leaving the column is collected in a first container where the oil is cooled indirectly while a stripping steam is blown directly into the oil for stripping of remaining volatile components.

However, industrial operation of the equipment described in WO 86/04603 soon revealed that the quality of the oil that had been physically refined and deodorised in said equipment was not up to standard, presumably because the short residence time in said equipment had prevented a sufficient degree of thermal breakdown of off-taste precursors.

Accordingly, the process was further improved according to U.S. Pat. No. 6,001,220 disclosing a deodorization plant comprising a vessel connected to vacuum in which there is both a distillation column filled with a structured packing material, through which the oil to be deodorised is brought to flow under influence of the gravity and meet a deodorization gas in counter-current, and a number of trays for collection of oil provided with drainage outlets in their lower parts, in which trays the oil is treated in batches with said deodorization gas. Although oil that has been deodorised or physically refined according to U.S. Pat. No. 6,001,220 showed an improvement in quality, the process according to this patent has the disadvantage that the pressure above the trays is relatively high because of the pressure drop over the column, and this relatively high pressure is not conducive to effective deodorization.

SUMMARY OF THE INVENTION

It is therefore an aim of the present invention to provide a method and apparatus for vacuum stripping, especially a method and apparatus for vacuum stripping as used in the physical refining and deodorization of edible oils, such as but not limited to vegetable oils, hydrogenated vegetable oils and animal fats, with a reduced stripping gas requirement.

Another aim of the present invention is to provide a sufficient residence time for the edible oil to attain a sufficiently high degree of thermal breakdown of off-flavour precursors.

Yet another aim of the present invention is to provide a sufficiently low pressure at the deodorization stage to strip the thermal breakdown products from the edible oil. Other objects and advantages of the invention will appear from the following description of the invention in conjunction with the drawing.

These aims are achieved by means of a vacuum stripping process of a liquid material or an apparatus therefore, such as for the refining or deodorization of edible oils, said process being performed in an apparatus comprising at least a first stripping vessel being supplied with said liquid material to be vacuum stripped and also being supplied with a gaseous stripping medium by a single pump that obtains this gaseous stripping medium from at least one further downstream second stripping vessel, said at least one second stripping vessel being equipped with two or more trays, over which a partially stripped material coming from the first stripping vessel is directed, wherein said partially stripped material on each of these trays is sparged with fresh gaseous stripping medium and said gaseous stripping medium is collected from above each tray of said at least one second stripping vessel by means of said pump.

An advantage of the process and/or apparatus according to the present invention is that by providing the same low pressure above the different trays of the downstream vessel and by redirecting the stripping medium from the downstream vessel to the first vessel, less stripping medium is required.

Another advantage of the process according to the invention is that providing at least two trays in the at least one second further downstream stripping vessel ensures that there is sufficient residence time for adequate breakdown of off-flavour precursors in the liquid material to be vacuum stripped. Said minimum residence time will depend upon parameters such as but not limited to temperature, pressure, type of oil or fat, and quality target, but may be determined by the skilled person without undue experimentation once the maximum admissible contents of off-flavour precursors are fixed.

Yet another advantage of the present invention is that by using a single pump to collect the gaseous stripping medium from above each tray in the at least one further downstream stripping vessel, the pressure above these trays can be set to a uniform and sufficiently low value to strip thermal breakdown products.

The present invention also concerns an apparatus that can be used in the vacuum stripping process of liquid materials such as edible oils, for instance vegetable oil or animal fat, such as described here-above, which apparatus comprises a first stripping vessel; at least one second stripping vessel further downstream from said first stripping vessel, said at least one second stripping vessel containing at least two trays each provided with sparging means (e.g. spargers), the apparatus further comprising a collector connecting said first stripping vessel and said at least one second stripping vessel, said collector being provided with inlet openings above each said tray, which collector is connected to a pump with a discharge into said first stripping vessel.

In order to better explain the characteristics of the invention, some preferred embodiments of an apparatus that can be used for a vacuum stripping process according to the invention are described as an example which in no way limits the scope of the invention.

In the accompanying drawing, FIG. 1 schematically represents one embodiment of an apparatus for vacuum stripping according to the invention.

The present invention will now be described with respect to particular embodiments and with reference to a certain drawing but the invention is not limited thereto but only by the claims. The drawing is only schematic and is non-limiting. In the drawing, the size of some of the elements may be exaggerated and not drawn on scale for illustrative purposes. Where an indefinite or definite article is used when referring to a singular noun e.g. "a" or "an", "the", this includes a plural of that noun unless something else is specifically stated.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

DETAILED DESCRIPTION OF THE INVENTION

Figure 1:
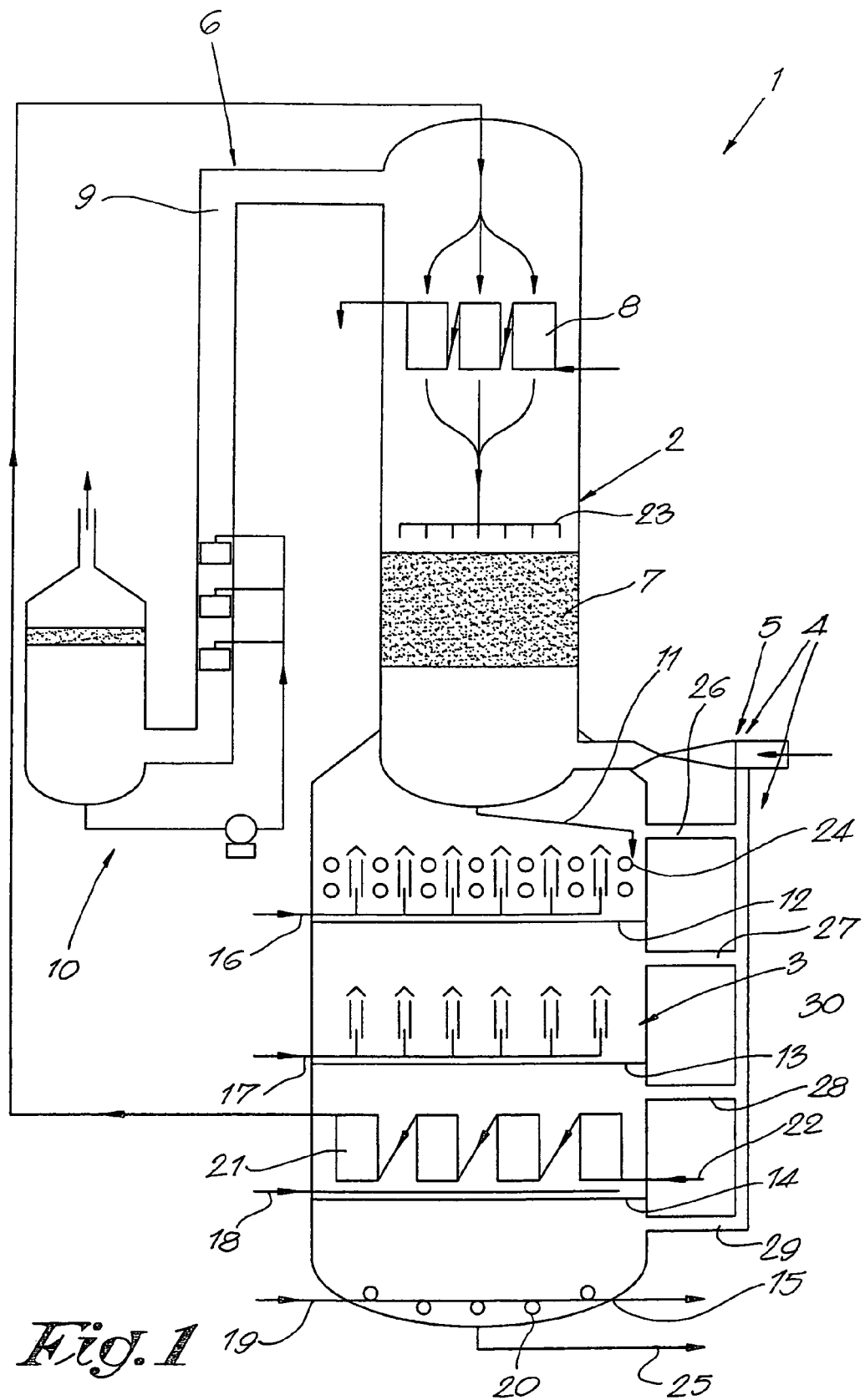
FIG. 1 shows an appartus having the stripping vessels in accordance with the invention.

In FIG. 1 an apparatus 1 is represented comprising a first stripping vessel 2, a second stripping vessel 3, a collector 4 connecting the two vessels 2 and 3 by means of a pump 5, and a main vacuum system 6. The first stripping vessel 2 comprises a packed column containing a packing 7 and a heater 8 situated above said packing 7. The top part of the stripping vessel 2, i.e. above the heater 8, is connected to the main vacuum system 6 by means of a pipe 9, which may contain a scrubber 10.

The bottom of the stripping vessel 2 is provided with a discharge pipe 11 leading to the upper part of the second stripping vessel 3.

The second stripping vessel 3 comprises, in the embodiment shown in FIG. 1, four trays 12, 13, 14 and 15. Each of these trays 12, 13, 14 and 15 contains a shallow pool of oil and each of these trays has been provided with a supply of fresh sparging steam. In FIG. 1, trays 12 and 13 have been provided with mammoth pumps to ensure an intimate contact between the sparging steam and the liquid oil. Tray 12 has also been provided with a heat exchanger 24 to heat the oil to the desired deodorization temperature. Tray 14 has also been provided with a heat exchanger for heat recovery purposes and tray 15 has been provided with cooling coils to cool the vegetable oil or animal fat down to storage temperature. Heat transfer in trays fitted with heat exchangers is efficiently ensured by the sparging steam blowing through the oil.

The cooler 20 can be connected to any cooling medium such as for example cooling water. The collector 4 is formed by four horizontal ducts 26, 27, 28 and 29 with an inlet opening above each tray 12, 13, 14 and 15, which ducts 26, 27, 28 and 29 are interconnected with each other by a common pipe 30 which is itself connected to an inlet of the above-mentioned pump 5. Said pump 5 is preferably a compression booster, but can be any other kind of pump allowing the transfer of gases from the second stripping vessel 3 to the first stripping vessel 2.

The method for vacuum stripping, more especially for the vacuum stripping as used in the deodorization and physical refining of edible oils, such as vegetable oil or animal fat, is easy to perform, for example as follows.

The oil to be treated is fed to the first stripping vessel 2 through the supply line 22 and is heated indirectly by outgoing oil in the heat exchanger 21 in the second stripping vessel 3 and by for instance high pressure steam in the heater 8 in the first stripping vessel 2.

The heated oil is dispersed over and flows through the packing 7 where it is stripped of its volatile components by the stripping medium, the latter being for instance in the form of water vapour or nitrogen gas as supplied by the pump 5. In addition to the stripping medium as supplied by pump 5, fresh medium may also be supplied at this stage.

The partially treated oil is discharged by means of a discharge pipe 11 to the uppermost tray 12 of the second stripping vessel 3 and flows subsequently to each of the trays 13, 14 and 15 below which it is further treated by means of fresh stripping medium which is sparged through the oil on each tray 12, 13, 14 and 15 by the spargers 16, 17, 18 and 19 and is then collected at the bottom of the second stripping vessel 3 by means of the oil conduct pipe 25.

The stripping medium used in the first stripping vessel 2 comprises or consists of a mixture of fresh stripping medium used as motive gas for the pump 5, in particular a booster, and of stripping medium collected from above the trays 12, 13, 14 and 15 of the second stripping vessel 3.

The process and/or apparatus according to the invention is particularly useful for the deodorization and especially for the physical refining of edible oils. These can be vegetable oils such as soybean oil, sunflower seed oil, rapeseed oil, palm oil, etc. or animal oils such as fish oil, lard or tallow. In order to prepare the oils for the process according to the invention, these oils may be neutralised by alkali refining and bleached if they are to be deodorised, or de-gummed and bleached if they are to be physically refined.

The use of a packing 7 in the first stripping vessel 2 has been found to be advantageous because of its relatively low space requirement and efficient use of stripping medium. However, such a packing 7 has the disadvantage that it constitutes a resistance to vapour flow and hence entails a considerable pressure drop which may be as high as 4 hPa or even higher. It is this disadvantage to which the process according to the invention brings a solution.

The method of counteracting and apparatus therefore entails using a further, downstream module consisting of a second stripping vessel 3 comprising two or more trays, in the embodiment shown four trays 12, 13, 14 and 15, each of which has its own stripping medium supply and is connected by horizontal ducts 26, 27, 28 and 29 respectively to a conduct pipe 30 of the collector 4 and the pump 5. Accordingly, the pressure above each tray 12, 13, 14 and 15 will be virtually identical. The pump 5 is preferably a booster as used in steam ejector vacuum systems. The oil leaving the first stripping vessel 2 is preferably fed by gravity to the second stripping vessel 3. This can be conveniently realised if both the first stripping vessel 2 and the further downstream second vessel 3 are superimposed inside the same shell.

Prior to being introduced into the apparatus according to the invention, the oil is degassed and heated to a temperature of for example 180 to 210° C. for instance by means of heat exchange with outgoing oil in the heat exchanger 21 and further heating by high pressure steam or any other suitable heat transfer medium in the heat exchanger 8. If located outside the stripping shell, this heat exchanger 8 may also be directly fired as described by Z. Kuroda et al. in *Journal of the American Oil Chemists' Society* (1989) 66:1781-1783. In that case it is not necessary to keep the oil under vacuum while heating to deodorization temperature.

If the oil to be processed according to the invention is to be physically refined and the amount of free fatty acids that has to be removed is relatively large, for instance above about 4% by weight, it can be advantageous to remove some of these fatty acids by a flash evaporation process by exposing the heated oil to vacuum in a flashing vessel (not shown in FIG. 1). The free fatty acid content of the oil exiting this flashing vessel is governed by Raoult's law and can already be substantially reduced provided that a low vacuum is maintained in this optional flashing vessel. The term '' low vacuum '' herein refers to a pressure lower than the partial pressure of the free fatty acids of concern.

Since the flashing process is adiabatic, the oil temperature will drop as a result of the evaporation of the free fatty acids in the flashing vessel. It may therefore be advantageous to reheat the oil before it is treated in the first stripping vessel 2. Another possibility is to superheat the oil prior to its entering the flashing vessel so that after flashing, the desired stripping temperature will be reached. Superheating the oil could in principle be deleterious to the oil quality but, because of the care taken in degassing the oil and because of the short residence time at this high temperature, the effect on oil quality has been found to be minimal. Therefore, it is also possible to heat the oil to an even higher temperature before exposing the oil to the flashing treatment and to cool it to the stripping temperature after said flashing treatment.

The optional flashing vessel can also conveniently be included inside the shell containing the stripping vessels 2 and 3. As has been mentioned above, the oil leaving the optional flashing vessel may be reheated or not. Similarly, the oil leaving the first stripping vessel 2 may be reheated or cooled by the heat exchanger 24, before being fed to the further downstream second stripping vessel 3 by means of a discharge pipe 11.

Excessive cooling of the oil, for example by more than 30° C. should preferably be avoided so as not to jeopardise the deodorization efficacy in said second stripping vessel 3.

Said second stripping vessel 3 may also contain a tray 15 provided with its own stripping medium sparging means 19 and connected to the same collector 4 as the other trays 12, 13 and 14 within said second stripping vessel 3, which tray 15 contains cooling coils 20 by which the deodorised oil is cooled down to storage temperature, before the refined, bland and deodorised oil is removed from the deodoriser shell.

In another embodiment of the process according to the invention, horizontal deodorization tubes may be used instead of the trays 12, 13, 14 and 15 mounted inside a shell. Accordingly, the oil leaving the first stripping vessel 2 is allowed to flow to the first of two or more of such horizontal deodorization tubes. According to another embodiment of the invention, each of said tubular deodorisers is provided with sparging medium and each of said tubular deodorisers is connected directly to the booster 5 that provides the first stripping vessel 2 with its stripping medium. This particular embodiment is especially useful for incorporating the heat exchangers 21 and/or 24 in between the tubular deodorisers.

In yet another embodiment of the process and/or apparatus according to the invention (not shown in FIG. 1), two or even more downstream second stripping vessels 3 and 3' are used in series. These downstream second stripping vessels 3 and 3' may each contain a single tray provided that each of them is fitted with its own pump, preferably a booster, 5 and 5' delivering stripping medium to the first stripping vessel 2. This embodiment has the advantageous feature that different pressures can be maintained in the various downstream second stripping vessels 3 and 3' by using pumps, e.g. boosters, 5 and 5' with different capacities.

Accordingly, the process and/or apparatus according to the invention allows liquid materials such as but not limited to edible oils, for instance vegetable oils or animal fats, to be deodorised at steadily decreasing pressures but the said process and/or apparatus according to the invention is not limited to such steadily decreasing pressures. It also incorporates for instance the embodiment whereby the oil is cooled at a pressure that is higher than the pressure prevailing at the last deodorization tray. In general, the pump, e.g. booster, serving a downstream second stripping vessel with two or more trays can supply a stripping vessel that is immediately upstream of said downstream second stripping vessel, whereas the pump, e.g. booster, serving a downstream second stripping vessel with a single tray will supply a stripping vessel that is further upstream thereof. In this way, re-dissolution of volatile compounds will be substantially avoided.

The process and/or apparatus according to the invention may be fully continuous or semi-continuous. In the latter case, the de-aeration or degassing step, the optional flashing stage and the primary stripping step will preferably be performed in a continuous manner, whereas the further downstream stripping operation or operations can be operated in a continuous or semi-continuous manner. As a general rule, a fully continuous mode of operation of the process according to the invention will preferably be chosen when stock (e.g. vegetable oil or animal fat) changes are few and/or far between.

EXAMPLES

The following examples are provided for illustration only and should in no way be understood as restricting the scope of the present invention.

Example 1 Comparative

A numerical example may serve to illustrate the characteristics and advantages of the process and/or apparatus according to the invention. This example is referring to a process being performed in the apparatus described in FIG. 1. By assuming that:

the oil leaving the first stripping vessel 2, in which a pressure of 5 hPa is maintained, still contains V kg volatile compounds per ton of oil, the second stripping vessel 3 has a single tray 12 above which a pressure of 2.5 hPa is maintained, and the stripping medium supply (5 kg per ton of oil) to said tray 12 is such that at the prevailing oil flow rate the volatile content would be reduced by half the original amount S, it follows that the volatile concentration of the vapour leaving said tray 12 equals $0.5*V/(S+0.5*V)$.

By further assuming that compressing the stripping medium from 2.5 hPa to 5 hPa requires 0.4 S (kg steam per ton of oil), it follows that the concentration of the volatile component in the compressed vapour equals $2*0.5*V/(1.4*S+0.5V)$. By neglecting the small amounts of volatile compounds in these vapour streams, the equations giving the volatile concentrations can be simplified to $0.5\ V/S$ and $V/(1.4*S)$ respectively.

Now the vapour leaving the tray 12 will be almost in equilibrium with the tray contents. It can be assumed that this vapour is in equilibrium with oil containing for instance $0.8*V$ kg volatile compounds per ton of oil. Since in any case $V/(1.4*S) > 0.5*V/(0.8*S)$, this means that the vapour stream being pumped into the first stripping vessel 2 will be supersaturated with respect to the oil leaving this same vessel 2. Consequently, volatile compounds will move from said vapour stream towards the liquid and dissolve therein.

Example 2

If now the second stripping vessel 3 is equipped with two trays 12 and 13 in accordance with the invention, the situation will be quite different from that of example 1. The volatile concentration in the vapour before compression would be only $(0.5+0.25)V/(2*S+(0.5+0.25)V)$ or, after simplification $0.75*V/(2*S)=0.38*V/S$, which is lower than the value of $0.5*V/S$ calculated for the single tray situation. After compression this concentration would increase to $2*0.38V/(1.4*S)$ or $0.54\ V/S$. This means that the compressed vapour stream will not be supersaturated with respect to the oil leaving the first stripping vessel 2 and consequently, no volatile components will dissolve in the oil being stripped in this vessel 2. On the contrary, the vapour stream can still accommodate some volatile compounds at the pressure pertaining at the bottom end of said first stripping vessel 2 and will strip out more volatile compounds when it rises to areas of lower pressure and is brought into contact with oil having a higher volatile content.

Similar calculations will easily demonstrate that including a third tray or even a fourth tray, into the second stripping vessel 3 will lead to a vapour stream that is even more unsaturated with respect to the oil at the bottom end of the first stripping vessel 2 and thereby constitutes an even better stripping means for this vessel 2.

Example 3

In order to illustrate the apparatus that can be profitably used in the process according to the invention, reference is again made to FIG. 1, giving a cross section of a deodoriser apparatus for performing the invention. This deodoriser comprises or consists of a shell, having an upper first stripping vessel 2 and a lower second stripping vessel 3.

De-gummed and bleached oil with a free fatty acid content of 5% by weight, calculated on the basis of oleic acid, is supplied to the deodoriser by a pump (not shown) via a heat exchanger 21 located in the second stripping vessel 3, where the incoming oil is pre-heated by the outgoing oil and via a further heater 8 located in the first stripping vessel 2, where the pre-heated oil is brought to process temperature by indirect heating with high pressure steam.

From the heater 8, the oil flows down through the packing 7 located in the first stripping vessel 2, whereby a distributor 23 ensures, an even distribution of the oil over said packing 7. The first stripping vessel 2 is connected to the main vacuum system 6 via a pipe 9 containing a scrubber 10. This main vacuum system 6 has been designed to maintain a pressure of 1.5 hPa, which is therefore the pressure above the heater 8.

However, because of the resistance of both heat exchanger 8 and the packing 7, there is a considerable pressure difference between the space above heater 8 and the space below the packing 7. This pressure difference may be so large that the pressure below the packing 7 may well reach 5 hPa when the main vacuum system 6 maintains a pressure of 1.5 hPa above the heater 8.

This pressure of 5 hPa is too high for effective deodorization of the partially de-acidified oil and is therefore lowered by means of the pump, e.g. booster, 5 so that the oil entering the second stripping vessel 3 is exposed to a pressure of only 2.5 hPa.

In FIG. 1, two deodorization trays 12 and 13 are shown as well as the tray 14 containing a heat exchanger 21 and the tray 15 containing a cooler 20.

In the lower cooler 20 the oil that has been pre-cooled in the heat exchanger 21 is further cooled down by indirect heat exchange with cooling water.

In this example, 1.50 kg stripping steam is used per ton of oil in each of the two deodorization trays 12 and 13, whereas the amount of stripping steam for tray 14 with the heat exchanger 21 and for tray 15 with the cooler 20 is only 0.25 kg steam per ton of oil. A lower amount has been chosen for the heat exchanger 21 and for the cooler 20, since there, the function of the stripping steam is mainly to ensure agitation and thus heat transfer, rather than deodorization. This brings the total amount of fresh stripping steam to 3.5 kg per ton of oil.

In accordance with the invention, the second stripping vessel 3 is connected via separate horizontal ducts 26, 27, 28 and 29 to a collector 4, leading to the pump, e.g. booster, 5. In this example, the booster 5 thus evacuates 3.5 kg steam per ton of oil and, in order to bring this amount to a pressure of 5 hPa, said booster 5 requires 2.5 kg steam per ton of oil. This means that the total amount of stripping steam passing through the packing 7 and the heater 8 in the first stripping vessel 2 equals 6 kg per ton of oil, which is therefore also the amount that has to be evacuated by the main vacuum system 6. Finally, the cooled fully refined, bleached and deodorised oil is evacuated from the second stripping vessel 3 by a pump (not shown) to go to storage.

If the apparatus shown in FIG. 1 were to be compared with a conventional apparatus without a pump (e.g. booster) 5, the pressure in the second stripping vessel 3 would be 5 hPa provided the same amount of 6.0 kg steam per ton of oil was used as the stripping medium and not the 3.5 kg steam per ton of oil as used in the process according to the invention.

Since the efficacy of a given weight or rate of supply of the stripping medium is inversely proportional to the deodo-rization pressure, it follows that using 3.5 kg per ton of oil at a pressure of 2.5 hPa is more effective than using 6 kg of steam per ton of oil at 5 hPa.

Consequently, the process according to the invention makes a more efficient use of the stripping medium (e.g. steam) and therefore saves a significant amount of energy with respect to conventional processes using an apparatus without a pump (e.g. booster) 5.

Use of the apparatus described above in an industrial installation with a throughput of 400 tons of palm oil per day with a free fatty acid content of 5% by weight, calculated on the basis of oleic acid, permitted fully deodorised, high quality oil to be obtained with a residual free fatty acid content of only 0.05% by weight, calculated on the basis of oleic acid, at a total steam consumption of only 60 kg steam per ton of oil. The total amount of sparging steam supplied to the deodorization trays 12 and 13, the tray 14 containing the heat exchanger 21 and the tray 15 with the cooler 20 amounted to 3.5 kg steam per ton of oil; the pump (e.g. booster) 5 used 2.5 kg steam per ton of oil and therefore the amount of stripping medium passing through the packing 7 was only 6 kg steam per ton of oil. In this example, the oil was heated to 260° C. before being evenly spread by the distributor 23 over the packing 7 where the oil temperature dropped by some about 6° C.

Accordingly, the temperature of the oil leaving the second tray 13 of the second stripping vessel 3, above which tray 13 a pressure of 2.5 hPa was maintained by the pump (e.g. booster) 5, was 253.8° C.

The invention, therefore, is well adapted to achieve the foregoing objects and to attain the advantages mentioned herein-above, as well as other advantages inherent therein.

The apparatus and/or process according to the invention is by no means limited to the embodiments described above or shown in FIG. 1, nor is the method for vacuum stripping according to the present invention by any means limited to the above examples; on the contrary, such a vacuum stripping process and the apparatus used for said vacuum stripping process can be applied and executed in a wide range of variations while still remaining within the scope of the invention.

The invention claimed is:

1. A vacuum stripping process for physical refining or deodorization of a liquid material, said process being performed in an apparatus comprising at least a first stripping vessel (2) and at least one second stripping vessel (3), said at least one second stripping vessel being equipped with two or more trays, over which a partially stripped material coming from the first stripping vessel (2) is directed, wherein said partially stripped material on each tray is each sparged with its own supply of fresh gaseous stripping medium and said gaseous stripping medium is collected from above each tray of said at least one second stripping vessel (3) via a conduct pipe (30) of the collector (4) and a single pump (5) resulting in virtually identical pressure above each tray, wherein said first stripping vessel is supplied with said liquid material to be vacuum stripped and also is supplied with said gaseous stripping medium by said single pump (5) and the inside of said first stripping vessel, comprises a packing.

2. A vacuum stripping process according to claim 1, wherein the liquid material to be vacuum stripped is an edible oil.

3. A vacuum stripping process according to claim 1, wherein the liquid material to be vacuum stripped has been exposed to vacuum in a flashing vessel and, after said exposure, is reheated before being vacuum stripped in the first stripping vessel (2).

4. A vacuum stripping process according to claim 1, wherein the liquid material to be vacuum stripped, after having been treated in the first stripping vessel (2), is brought to a higher temperature by means of a heat exchanger (24) before being treated in the at least one second further downstream stripping vessel (3).

5. A vacuum stripping process for physical refining or deodorization of a liquid material, said process being performed in an apparatus comprising at least a first stripping vessel (2) and at least one second stripping vessel (3), said at least one second stripping vessel being equipped with two or more trays, over which a partially stripped material coming from the first stripping vessel (2) is directed, wherein said partially stripped material on each tray is each sparged with its own supply of fresh gaseous stripping medium and said gaseous stripping medium is collected from above each tray of said at least one second stripping vessel (3) by means of a single pump (5), wherein said first stripping vessel is supplied with said liquid material to be vacuum stripped and also is supplied with said gaseous stripping medium by said single pump (5) and the inside of said first stripping vessel comprises a packing, wherein the liquid material to be vacuum stripped, after having been treated in the first stripping vessel (2), is brought to a lower temperature by means of a heat exchanger (24) before being treated in the at least one second further downstream stripping vessel (3).

6. A vacuum stripping process according to claim 1, wherein the said at least one second stripping vessel (3) operates in a semi-continuous manner.

7. A vacuum stripping process according to claim 2, wherein said edible oil is selected from the group consisting of vegetable oils, hydrogenated vegetable oils and animal fats.

8. A vacuum stripping process according to claim 1, wherein said first stripping vessel operates in a continuous manner and said at least one second stripping vessel (3) operates in a semi-continuous manner.

9. The vacuum stripping process according to claim 1, wherein the pressure above each tray is set at a uniform value.

10. The vacuum stripping process according to claim 5, wherein the liquid material to be vacuum stripped is an edible oil.

11. The vacuum stripping process according to claim 5, wherein the liquid material to be vacuum stripped has been exposed to vacuum in a flashing vessel and, after said exposure, is reheated before being vacuum stripped in the first stripping vessel (2).

12. The vacuum stripping process according to claim 5, wherein the liquid material to be vacuum stripped, after having been treated in the first stripping vessel (2), is brought to a higher temperature by means of a heat exchanger (24) before being treated in the at least one second further downstream stripping vessel (3).

13. The vacuum stripping process according to claim 5, wherein the said at least one second stripping vessel (3) operates in a semi-continuous manner.

14. The vacuum stripping process according to claim 5, wherein the at least second downstream stripping vessel comprises or consists of one or more horizontal tubular deodorisers.

15. A vacuum stripping process according to claim 1, wherein said second stripping vessel is equipped with trays (12), (13), (14) and (15).

16. A vacuum stripping process according to claim 5, wherein said second stripping vessel is equipped with trays (12), (13), (14) and (15).

17. A vacuum stripping process according to claim 1, wherein said second stripping vessel is equipped with trays (12) and (13).

18. A vacuum stripping process according to claim 5, wherein said second stripping vessel is equipped with trays (12) and (13).

* * * * *